United States Patent Office 3,513,125
Patented May 19, 1970

3,513,125
CARBAZATE CROSSLINKING AGENT AND THERMOSETTING RESIN COMPOSITIONS AND PROCESS OF MAKING SAME
Clifton L. Kehr, Silver Spring, Md., assignor to W. R. Grace & Co., New York, N.Y., a corporation of Connecticut
No Drawing. Filed Feb. 24, 1967, Ser. No. 618,345
Int. Cl. C08g 30/14
U.S. Cl. 260—47      9 Claims

ABSTRACT OF THE DISCLOSURE

A novel class of crosslinking compounds is described which can be broadly classified as blocked hydrazine derivatives. They are most suitable for use with thermosetting resins, halogenated thermoplastics and elastomers. The major advantage in their use is that the crosslinking is not initiated except at a relatively high "trigger temperature," at which temperature crosslinking is quick and complete, without any post cure, or scorching in the pot.

---

This invention relates to a novel method of crosslinking thermosetting resins, halogenated thermoplastics, and elastomers. More particularly, this invention provides a novel class of crosslinking agents which are useful for the above resins.

In summary, this invention comprises providing a crosslinking agent which is represented as a member chosen from the group consisting of:

A—B

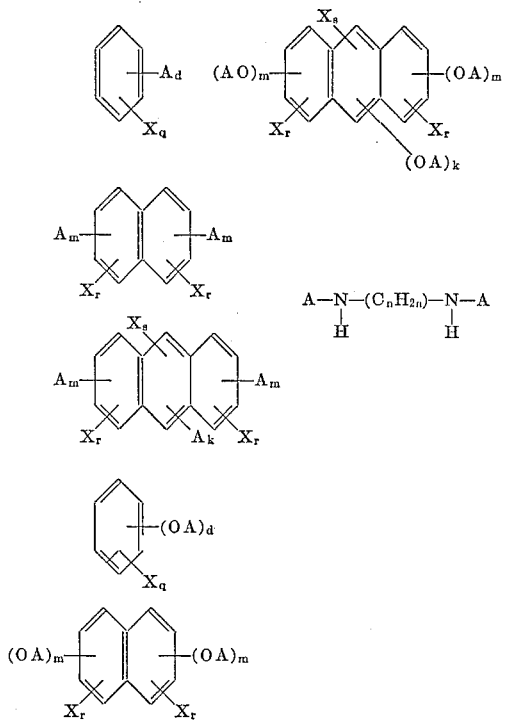

wherein A is a member chosen from the group consisting of:

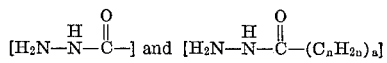

and X is a member chosen from the group consisting of alkyl, amino, nitro, aryl, alkoxy and aryloxy radicals, and A; and B is a member of the group consisting of:

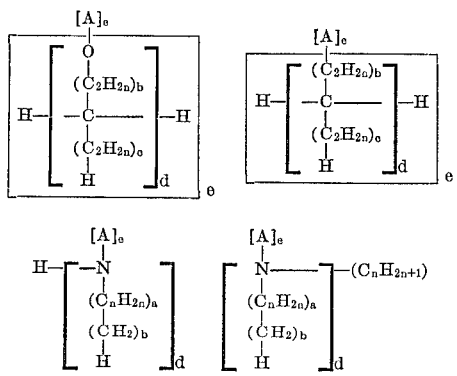

wherein $m$ is 1 to 4         $b$ is 0 to 20        $q$ is 0 to 5
$n$ is 1 to 20        $c$ is 0 to 20        $r$ is 0 to 3
$k$ is 1 to 2         $d$ is 1 to 6         $s$ is 0 to 1
$a$ is 0 to 20        $e$ is 0 to 1

$q, r, s, k, m, n, a, b, c, d$ and $e$ being independently selected from integers within said ranges, and the sum of $d+q$ is equal to 6, the sum of $m+r$ is equal to 4, the sum of $k+s$ is equal to 2, N being nitrogen, H being hydrogen; C being carbon; and O being oxygen.

Crosslinking or curing of certain polymers generally referred to as "diamine-curable polymers" such as selected types of thermosetting resins, halogenated and polar-modified thermoplastics and elastomers, has long been done with organic diamines containing active hydrogen as curing agents. However, in most cases the diamines are extremely reactive and for many applications the curing takes place too rapidly. Attempts have been made to "mask" or "block" the diamine so that the reaction can be slowed down. Commercial examples of this include sterically hindered diamines, or diamine salts. However, "blocked" diamines pose other problems, such as discoloration of the crosslinked polymer, and such a slow degree of reactivity that even after crosslinking is initiated, it is too sluggish for a commercially feasible process.

In summary, there has long been a need for crosslinking agents that provide the following characteristics:

(A) Do not significantly discolor the polymer,
(B) Do not crosslink prematurely either in the blender or in the mold before desired,
(C) Crosslink rapidly and completely once initiated so that the reaction can be quantitatively controlled to a great extent,
(D) Do not "postcure" i.e., crosslinking for all practical purposes is complete in the mold, so the molded product does not continue to set up to the point of brittleness.
(E) Are not volatile, so that evaporation loss is kept to a minimum, and toxicity hazards are minimized.

This invention has as its objects, to provide a composition which will meet all the above criteria.

I have now found that there are certain derivatives of the inorganic compound, hydrazine ($H_2N–NH_2$), that are superior agents for controlled compounding and curing of various diamine curable polymers. These agents can all be classified as a member chosen from the group consisting of:

A—B

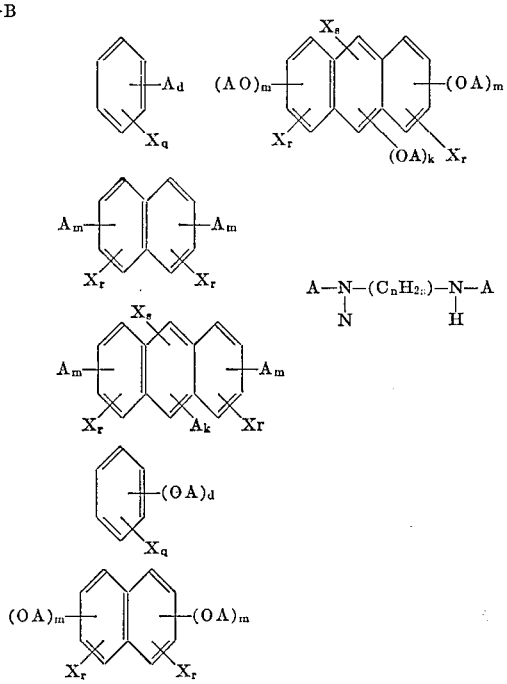

wherein A is a member chosen from the group consisting of:

$$[H_2N-\underset{H}{N}-\overset{O}{\underset{\|}{C}}-] \text{ and } [H_2N-\underset{H}{N}-\overset{O}{\underset{\|}{C}}-(C_nH_{2n})_a]$$

and X is a member chosen from the group consisting of alkyl, amino, nitro, aryl, alkoxy and aryloxy radicals, and A; and B is a member of the group consisting of:

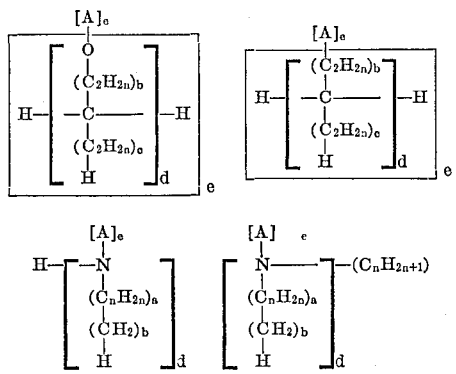

wherein m is 1 to 4
n is 1 to 20
k is 1 to 2
a is 0 to 20
b is 0 to 20
c is 0 to 20
d is 1 to 6
e is 0 to 1
q is 0 to 5
r is 0 to 3
s is 0 to 1

$q, r, s, k, m, n, a, b, c, d$ and $e$ being independently selected from integers within said ranges, and the sum of $d+q$ is equal to 6, the sum of $m+r$ is equal to 4, the sum of $k+s$ is equal to 2, N being nitrogen, H being hydrogen, C being carbon, and O being oxygen.

By the term "alkyl" is means a saturated hydrocarbon radical, either branched, straight chain or a ring structure. By the term "aryl" is means an aromatic ring structure.

These compounds of my invention can be described as "blocked" hydrazine compounds and may be classified as carbazic acid amides and polyamides, carbazic acid esters and polyesters, and acylated and polyacylated hydrazines.

Examples of suitable crosslinking agents include the following monofunctional and polyfunctional compound: carbazic acid amide ($H_2NHNCONH_2$), N-ethyl carbazic acid amide ($H_2NHNCOHNC_2H_5$), N-ethyl-N-propyl carbazic acid amide ($H_2NHNCONC_3H_7C_2H_5$), N-capryl-N-lauryl carbazic acid amide, ($H_2NHNCONC_{14}H_{29}C_{10}H_{21}$), $$H_2NHNCONH-CO-NH-NH_2,$$

$$H_2N-HNCONHC_2H_4NHCONHNH_2,$$

t-butyl carbazate, ethyl carbazate, methyl carbazate, phenyl carbazate, myristyl carbazate, the tricarbazic acid ester of trimethylol propane, the tetra carbazic acid ester of pentaerythritol, the dicarbazic acid ester of ethylene glycol, the hexacarbazic acid ester of sorbitol, the pentacarbazic acid ester of adonitol, benzoic acid hydrazide, stearic acid hydrazide, oxamic acid hydrazide, phenyl acetic acid hydrazide, palmitic acid hydrazide, oxalic acid dihydrazide, succinic acid dihydrazide, and adipic acid dihydrazide, as well as many others.

The polymers which can be modified and/or crosslinked by the above agent include all polymers that normally are cured with amines or diamines or polyamines. A partial listing of such polymers include epoxy resins, —NCO-terminated polyurethanes, imine terminated polymers, chloro-sulfonated polyethylene, fluoro polymers, chlorinated polymers, iodo polymers, ketone or aldehyde polymers and acrylate ester and methacrylate ester polymer and copolymers, and carboxylated and sulfonated polymers. Commercial examples of all of these classes of polymers are readily available and many will become apparent to one skilled in the art. It should be noted that with such a broad choice of polymers and crosslinking agents certain combinations will not provide all the necessary advantages. However, one skilled in the art will be able to pick a particular crosslinking agent most suitable for the particular polymer chosen at the optimum crosslinking conditions.

The advantages of the inventive "blocked" hydrazine reactants over crosslinking agents of a prior art include (1) better control of the degree of crosslinking by controlling the temperature of reaction, (2) the ability to crosslink completely and quickly once initiated, (3) no serious discoloration effects on the polymer, and (4) no adverse premature crosslinking or "scorching," hence improved pot life, etc.

The operable range of my inventive "blocked" hydrazine crosslinking agents in the polymers to be crosslinked is from 0.5 to 35% based on the weight of the polymer, and preferably 2–20 weight percent. Another way of expressing these ranges in moles of crosslinking compound per 100 grams polymer provides a broad range of 0.01–0.5 mole and a preferred range of 0.1–1.0 mole per 100 grams polymer. A greater amount is not essential to obtain good rapid crosslinking; in fact, greater amounts of the additives become detrimental to the stability of the polymer.

The compounding or blending step of the invention is performed at temperatures at which the polymer is sufficiently soft to be worked, i.e., the softening temperature for the chosen polymer. Thus, the exact temperature is a function of the softening point of each polymer. Generally, it is performed at temperatures in the range of room temperature to 210° C., for the polymers listed. Higher or lower temperatures are operable but are usually unnecessary.

In the optimum practice of this invention, the chosen "blocked" hydrazine crosslinking agent in the chosen polymer system is preferably completely nonreactive at the blending temperature, and become active only upon heating. This provides a means of "triggering" the crosslinking reaction when, and only when, desired. The crosslinking step of this invention is performed at temperatures above those required for compounding, blending and fabricating into the final shape for the intended use. Thus the exact temperature is a function of the softening temperature or milling temperature of each polymer. Generally the crosslinking is performed in the range of 70° C. to 300° C. for the polymers listed.

Also operable in the present invention are "blocked" hydrazine compound precursors, i.e., compounds or mixtures of compounds which will generate the desired "blocked" hydrazine derivatives as defined supra in situ in the final polymeric compounded mixture.

The following examples are set down to illustrate the invention and are not deemed to limit the scope thereof.

Throughout the instant invention the melt indices (MI) were measured under conditions specified in ASTM–D–1238–52T. The densities of the polymers were measured under conditions specified in ASTM-D-1505-57T. In the examples unless otherwise noted, a Brabender Plastograph Model P1B2 equipped with a recording unit for measuring changes in torque was used for the compounding or blending step. The aforesaid recording unit had a range of 0 to 1000 units equal to 0 to 1 meter kilogram of torque. This range can be increased when necessary to 0 to 5000 i.e., equal to 0 to 5 meter kilograms of torque by addition of weights.

The degree of crosslinking can be measured in various ways. For example the degree of crosslinking can be related to the change in torque measured by the Plastograph recorder from the time the crosslinking agent is added to fused polymeric material until the reaction is discontinued either prematurely or because maximum torque has been achieved. The greater the degree of crosslinking, the greater the viscosity of the polymeric material which in turn requires a greater torque in order to drive the Plastograph in a constant r.p.m. A further check of the degree of crosslinking is the change in melt index due to crosslinking of the polymeric material. Since melt index varies inversely with viscosity which varies directly with the degree of crosslinking, a lower melt index after crosslinking evidenced that crosslinking occurs. A still further indication of the amount of crosslinking is the reduction in the percent carbonyl after the crosslinking step. A still further method is to determine by solvent extraction the amount of solvent insoluble polymer in the cured sample per total weight of sample, referred to as "percent gel." In this application refluxing xylene solvent was used in the percent gel determinations.

Unless otherwise noted all parts are percentages by weight in the examples.

EXAMPLE 1

25 grams of a —NCO terminated pourable liquid polyurethane polymer (sold under the trade name Adiprene L-100 by E. I. du Pont de Nemours and Co., Inc.) containing 0.025 equivalent of NCO groups was admixed with phenyl carbazate (3.8 grams) containing 0.025 equivalents NH$_2$ in methylene chloride solvent. There was no change in viscosity of the product for 5 days at room temperature. However, when the polymer containing crosslinking agent was heated to 90–100° C., the viscosity increased dramatically in less than 2 hours. The product when cooled to room temperature was a tacky, rubbery solid. A "control" run in which the polymer contained no crosslinking agent was made. After a similar heating treatment, the polymer remained a pourable liquid when cooled to room temperature. When a conventional diamine curing agent (hexamethylene diamine) was used with this polymer, the product set up at room temperature in times ranging from 1 minute to 3 hours.

EXAMPLE 2

15 grams of an epoxy resin (sold under this trade name Epon 828 by the Shell Chemical Co.) and 2.6 grams of tertiary butyl carbazate were admixed at room temperature. The product had a gel time at 150° C. of ½ hour, and did not set at room temperature for times in excess of 4 days. Conventional diamine curing agents (triethylene tetramine, m-phenylene-diamine) when mixed with the resin at room temperature gelled in times ranging from 1 to 18 hours. Epon 828 is an organic polyepoxide material having a plurality of reactive 1,2-epoxy groups. It is a diglycidyl ether of bisphenol A.

EXAMPLE 3

Example 2 was repeated except that the tertiary butyl carbazate was replaced by 2.1 grams of the dicarbazic acid ester of ethylene glycol. The gel time at room temperature was in excess of 24 hours, but at 150° C. the epoxy composition set up to a rubbery gel in less than 30 minutes.

EXAMPLE 4

25 grams of an imine-terminated liquid polymer (sold under the trade name ITP–67 by Interchemical Corporation) was admixed with 0.77 gram of phenyl carbazate. The product did not gel at room temperature for 60 days. On heating to 90 to 95° C. the mixture cured to a solid rubbery material within 1 hour. Conventional curing agents (dimer acid; trimer acid) gelled the imine-terminated polymer at room temperature in less than 2 days.

EXAMPLE 5

Example 4 was repeated except the phenyl carbazate was replaced by 0.41 gram of the tetra-carbazic acid ester of pentaerythritol. The compounded product had a pot life (i.e., no gelation occurred) in excess of 7 days at room temperature. On heating to 120° C., however, the imine terminated polymer cured to a solid elastomer within 1 hour.

EXAMPLES 6–16

Table I illustrates the different crosslinking agents of this invention that can be used to crosslink an oxidized ethylene polymer. This polymer is a high density polyethylene which is oxidized in the solid state. Active sites are the ketone, carbonyl and carboxylic groups formed on the polyethylene chains. The polymer used in Table I has a melting point of about 120° C., and a melt index of 8.4, and a carbonyl content of 0.19 meq. CO/gram and a carboxyl content of 0.10 meq. COOH/gram. It was compounded with the crosslinking agents by milling for 5–10 minutes at 120–130° C. in a Brabender Plastograph. The "crosslinking trigger temperature" is used to mean the temperature above which the polymer/crosslinking agent composition must be heated in order to initiate crosslinking at a practical rate. The term "gel percent" is a measure of the crosslinked polymer which is insoluble in refluxing xylene; the percent has a weight basis.

Example 16 is a "control" run which illustrated the need for the "blocking" groups in the agents of the present invention. Hydrazine, the parent compound from which the blocked agents are derived, is so reactive that it cannot be compounded into the oxidized polymer without causing an undesirable premature curing reaction which takes place during the mixing step. Hence we find 49% gel content in the compounded blend even before any curing step is carried out. Obviously this gelled, crosslinked raw compound is unsuitable for any practical commercial usage.

EXAMPLES 17–32

The following examples, data for which is summarized in Table II, show that the crosslinked products of this invention show improved physical properties. In the examples shown, flexibility and toughness of the polymer is improved as shown by a lower tensile modulus, or stiffness; higher ultimate elongation, and higher impact strength.

TABLE I

| Crosslinking compound [1] | Crosslinking trigger temp. (°C.) | Curing time, 15 min. | |
|---|---|---|---|
| | | Curing temp. (°C.) | Gel, percent |
| 6  t-Butyl carbazate | 140 | 130 | Nil |
| | | 160 | 41 |
| 7  Ethyl carbazate | 160 | 130 | Nil |
| | | 180 | 27 |
| 8  Methyl carbazate | 170 | 130 | Nil |
| | | 190 | 29 |
| 9  Benzoic acid hydrazide | 140 | 130 | Nil |
| | | 160 | 33 |
| 10  Stearic acid hydrazide | 150 | 130 | Nil |
| | | 160 | 22 |
| 11  Oxamic acid hydrazide | 170 | 130 | Nil |
| | | 180 | 36 |
| 12  Carbamic acid hydrazide | 180 | 180 | Nil |
| | | 225 | 35 |
| 13  p-Hydroxybenzoic acid hydrazide | 190 | 180 | Nil |
| | | 225 | 45 |
| 14  o-Amino benzoic acid hydrazide | 200 | 180 | Nil |
| | | 225 | 19 |
| 15  Phenylacetic acid hydrazide | 210 | 200 | Nil |
| | | 225 | 58 |
| 16  Hydrazine (unblocked control) | <30 | [2] Raw | 49 |
| | | 130 | 43 |
| | | 160 | 56 |
| | | 225 | 54 |

[1] Concentration 0.048 mols/100 grams polymer, except in Example 10, which was 0.012 moles/100 grams polymer.
[2] Uncured.

TABLE II

| Curing Agent | Cured 15 min. at (° C.)— | Percent gel | Tensile modulus, lbs./in.$^2$ | Failure elong., percent | Tension impact, ft. lbs./in.$^2$ |
|---|---|---|---|---|---|
| 17  None | 130 | Nil | 437,845 | 5.8 | 22 |
| 18  do | 180 | Nil | 427,955 | 7.1 | 22 |
| 19  Methyl carbazate | 130 | 1 | 426,595 | 5.8 | 17 |
| 20  do | 180 | 9 | 366,735 | 398 | 67 |
| 21  Ethyl carbazate | 130 | 0 | 388,185 | 6.0 | 49 |
| 22  do | 180 | 9 | 362,965 | 560 | 73 |
| 23  t-Butyl carbazate | 130 | 2 | 243,795 | 73 | 56 |
| 24  do | 180 | 39 | 276,965 | 430 | 68 |
| 25  Phenyl carbazate | 130 | 14 | 303,815 | 100 | 65 |
| 26  do | 180 | 22 | 369,290 | 330 | 50 |
| 27  Semicarbazide | 130 | 2 | 312,285 | 18.1 | 27 |
| 28  do | 180 | 34 | 323,815 | 250 | 41 |
| 29  Benzoic acid hydrazide.* | 130 | 2 | 358,445 | 10.6 | 27 |
| 30  do | 180 | 26 | 308,855 | 120 | 33 |
| 31  Ethyl carbazate; coated on oxidized polyethylene. | 135 | Nil | 248,375 | 3.4 | 15 |
| 32  do | 180 | 30 | 224,750 | 155 | 32 |

*0.048 mole agent/100 grams OPEX.

The polymer used was the same oxidized polyethylene described in Examples 4–14. The amount of crosslinking agent used was 0.024 mole per 100 grams of the polymer in all cases except Examples 17 and 18, the controls, and in Examples 29 and 30, in which 0.048 mole of crosslinking agent was used per 100 grams polymer.

The polymer and crosslinking compound composition can, if desired, include other additives which do not react directly with the reactive group or the crosslinking compounds which are normally employed in plastic compositions. By such additives is meant the inclusion of plasticizing, lubricating, extending, foaming, filling, stabilizing, flame retarding, coloring ingredients such as dyes and pigments and activators or accelerators for the crosslinking reactions. The proper choice of such additives would be obvious to one skilled in the art.

Various methods of admixing the polymer and the crosslinking compounds can be employed in practicing the instant invention. For example, the crosslinking compound can be added directly to the liquid or molten polymer or to the polymer in the form of a dry powder, tape or film, or to the polymer contained in an emulsion or dispersion form. In addition, the crosslinking compound can be admixed with the polymer at ambient conditions and thereafter heated above the softening point of the polymer. To aid uniformity of admixture a solvent for the crosslinking compound can if desired be employed. Generally polar solvents which will not interfere with the crosslinking reaction are used. Examples of operable solvents include water, benzene, methylene chloride, and alcohol. The crosslinked polymer products of the instant invention have many and varied uses e.g., wire coating; fibers; film; foams; containers; extruded, calendered or molded items; protective or decorative coatings for wood, metal, paper, etc.; caulking compositions; filleting compositions; adhesives; gaskets and the like.

I claim:

1. A composition useful for the production of a crosslinked resin, said resin selected from the group consisting of an organic polyepoxide material having a plurality of reactive 1,2-epoxy groups, —NCO-terminated polyurethanes, imine-terminated polymers, and oxidized ethylene polymers consisting essentially of a resin selected from the above group and 0.5 to 35% by weight based on the resin of a crosslinking agent of the general formula:

wherein A is the carbazate group

and X is a hydrocarbyl moiety selected from the group consisting of alkyl and aryl moieties.

2. The composition according to claim 1 wherein the crosslinking agent is an alkyl carbazate.

3. The composition according to claim 2 wherein the alkyl carbazate is t-butyl carbazate.

4. The composition according to claim 1 wherein the resin is an organic polyepoxide material having a plurality of reactive 1,2-epoxy groups and the curing agent is 17.3% by weight of said resin of t-butyl carbazate.

5. A process for crosslinking a resin selected from the group consisting of an organic polyepoxide material having a plurality of reactive 1,2-epoxy groups, —NCO-terminated polyurethanes, imine-terminated polymers, and oxidized ethylene polymers which comprises blending said group member with 0.5 to 35% by weight based on the resin of a crosslinking agent of the general formula:

wherein A is the carbazate group

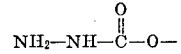

and X is a hydrocarbyl moiety selected from the group consisting of alkyl and aryl moieties at a temperature above the softening point of the resin group member and thereafter heating the blend at a temperature in the range 70–300° C. for a time sufficient to effect crosslinking.

6. The process according to claim 5 wherein the crosslinking agent is an alkyl carbazate.

7. The process according to claim 6 wherein the alkyl carbazate is t-butyl carbazate.

8. The process according to claim 6 wherein the resin group member is an organic polyepoxide material having a plurality of reactive 1,2-epoxy groups and the curing agent is t-butyl carbazate in an amount equal ot 17.3% by weight of the resin.

9. The process according to claim 8 in which the blend is heated to 150° C. to effect crosslinking.

References Cited

UNITED STATES PATENTS 2,847,395  8/1958  Wear.
3,386,956  6/1968  Nawakowski et al.

WILLIAM H. SHORT, Primary Examiner

T. E. PERTILLA, Assistant Examiner

U.S. Cl. X.R.

117—128, 148, 155, 161; 260—2, 77.5, 94.9, 2.5, 29.1, 29.2